Dec. 30, 1969    M. T. WORKS ET AL    3,486,734
VALVE
Filed July 1, 1966    2 Sheets-Sheet 1
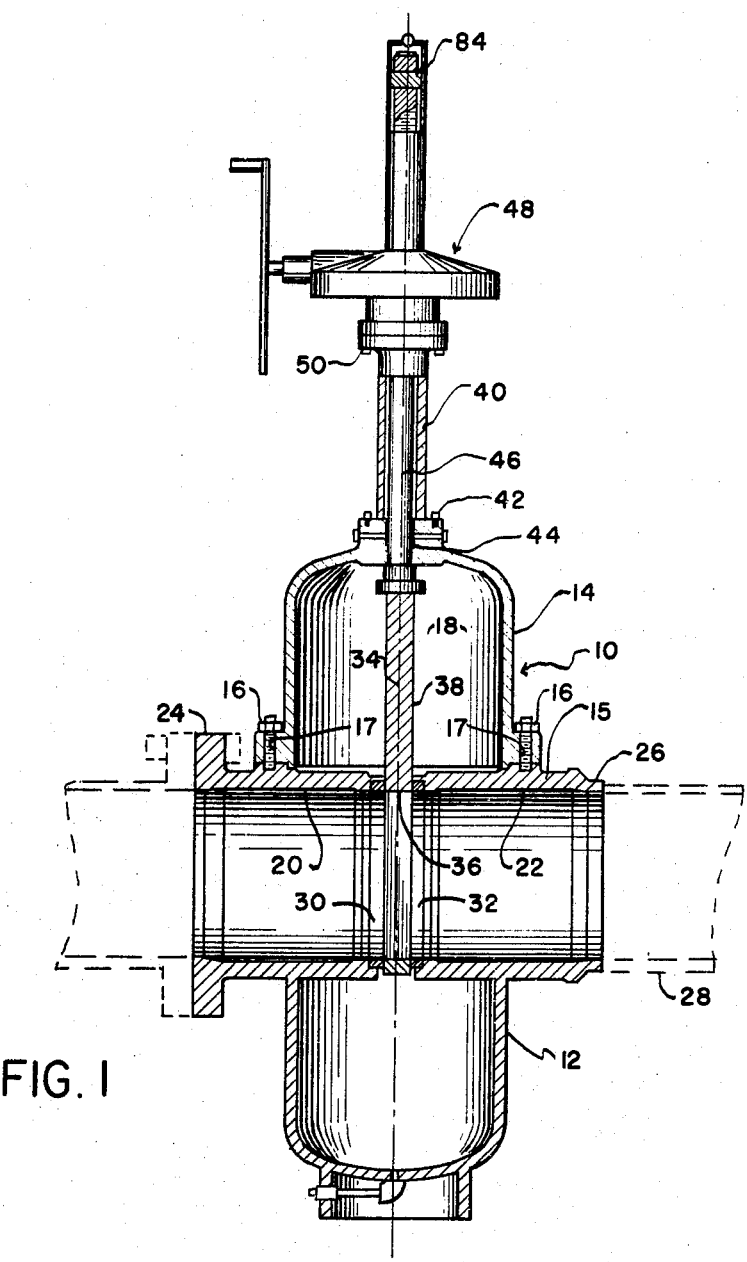
FIG. I
INVENTORS
MADDEN T. WORKS
HENRY C. TOOLEY
BY
*James Jackson*
AGENT

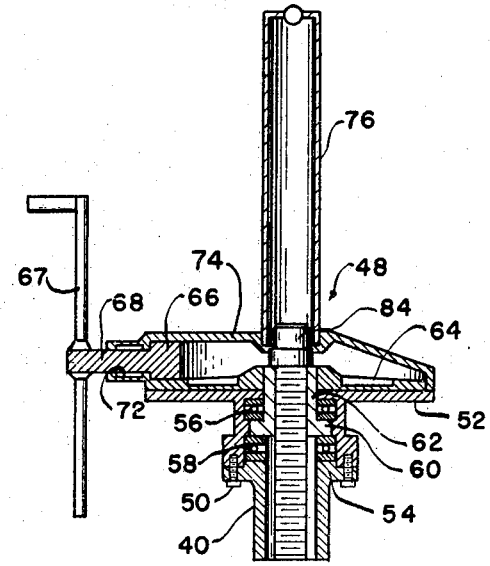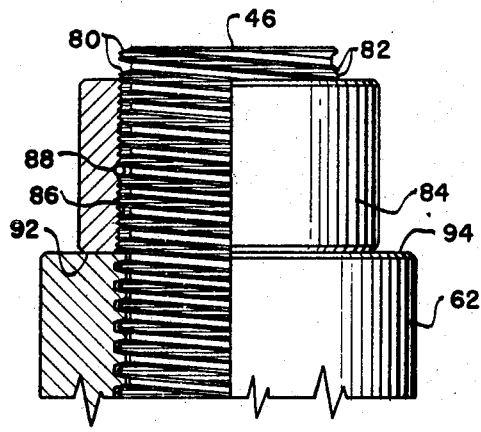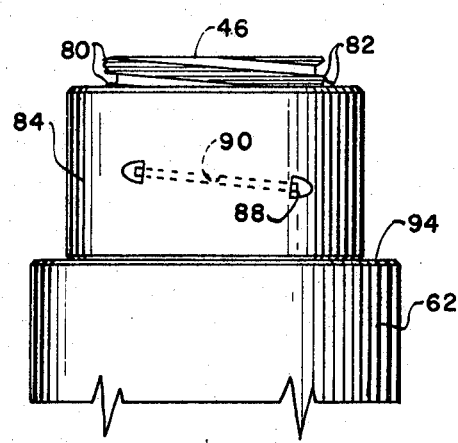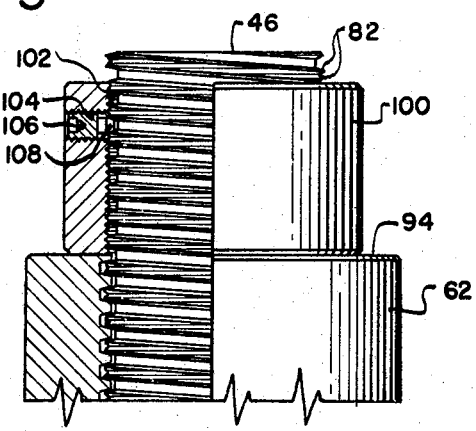

3,486,734
Patented Dec. 30, 1969

3,486,734
VALVE
Madden T. Works and Henry C. Tooley, Houston, Tex., assignors to ACF Industries Incorporated, New York, N.Y., a corporation of New Jersey
Filed July 1, 1966, Ser. No. 562,202
Int. Cl. F16k *51/00, 31/44;* F16b *39/00*
U.S. Cl. 251—285                                7 Claims

ABSTRACT OF THE DISCLOSURE

A valve stem and stem stop construction for rising stem gate valves and the like comprising a valve stem having coarse threads formed thereon and having fine threads formed on the crests of the coarse threads. The fine threads are provided with an opposite pitch relative to the pitch of the coarse threads. A stem stop member is received in threaded engagement with the fine threads and is provided with a locking member which is received between the flanks of the coarse threads. A gate drive nut is threadedly received on the coarse threads and engages the stop member at the lowermost position of the stem.

---

This invention relates generally to valves and other mechanical devices which are controlled by a reciprocating stem and more specifically to an adjustable stop construction for limiting reciprocating movement of the stem in one direction. While the invention will function effectively in constructions other than valves, for purpose of simplicity, the invention will be discussed only in its application to gate valve structures of the rising stem type. Discussion of the invention in association with gate valve structures is not intended to limit the spirt or scope of the invention in its broad aspect.

Most rising stem valves provide for proper positioning of the valve member relative to the flow passages of the valve by engagement between the valve member and the valve body. While such positioning may be satisfactory for the operation of most valves, when the valve design requires that the gate member be allowed freedom of movement within the valve body, this feature is not satisfactory. Engagement between the gate member and the valve body to position the gate frequently results in binding of the gate member which prevents the gate member from seeking a proper sealing relationship with the seat member of the valve. To properly position the valve member, therefore, without incurring the possibility of binding the gate member within the valve body, it is necessary to provide stop structure which limits movement of the operating stem of the valve in the closed direction.

Valve stem stops have been provided for rising stem valves to limit longitudinal movement of the valve stem in one direction, thereby causing positioning of the gate member of the valve in properly aligned position with the flow passages of the valve. For example, stop members have been provided in the form of a sleeve which fits about the valve stem and which is connected in immovable relation to the valve stem by a pin member extending through the valve stem and sleeve. The stop member may also take the form of a nut which is threadedly received by the threads of conventional valve stems and which is retained in immovable relationship with the valve stem by means of an interlocking pin or other suitable locking structure. Stop structures have also taken the form of a connector between the valve stem and gate. These connectors are adapted to engage internal portions of the valve body such as the hubs for limiting movement of the gate and stem in one direction.

A number of problems arise both from a manufacturing standpoint and from a repairing standpoint when stop members are permanently pinned in immovable relationship with the stem member. A matter of primary importance concerning the assembly of valves concerns the requirement for a manufacturing operation during the assembly of the valve parts. After the gate stem and gate drive mechanisms have been assembled to the valve structure, it is present practice for the stop member to be positioned about the valve stem after proper alignment of the gate member has been established. The stop member and stem are then drilled in assembly to provide a properly aligned bore for receiving a pin interlocking the same in immovable relation. This, of course, requires that there be maintained at the assembly site apparatus including a jig or fixture for the drilling operation and suitable drilling apparatus. To accomplish the drilling operation during assembly of the valve is quite expensive in addition to risking the contamination of the valve drive gearing with metal particles resulting from the drilling operation.

Another serious disadvantage in permanently pinning the valve stop member to the valve stem is that it complicates valve repair operation, especially when valves are repaired under field conditions. When valves are repaired, it is frequently necessary to replace the valve drive stem along with various other parts. This necessitates the drilling of the replaced valve stem under field conditions, rendering the repair operation extremely difficult. The valve repairman under these conditions must have at his command various jigs, fixtures, and drilling apparatus which may be necessary for the drilling operation. It is highly impractical to maintain portable equipment for a valve repair operation of this nature. The possibility of contamination of the operator gearing due to metal fouling from the drilling operation is even greater when repair operations of this nature are accomplished in the field.

A disadvantage frequently encountered during field repair operations of valves having stop members permanently fixed to the valve stem, as indicated above, results from the need for minor adjustment of the stop member to compensate for wear of the valve parts. Under these conditions, the stop member and valve stem structure must be redrilled for proper positioning or shims must be provided between the stop member and stem drive structure to provide the required adjustment. Multiple drillings of the valve stem structure result in undesirable weakening of the valve stem. The use of shims for spacing the stop member and the stem drive member is generally felt to be an undesirable procedure since the shims are only useful for adjustment in one direction. The shims also may become broken and cause fouling of the gears of the valve drive structure.

As indicated above, valves are frequently provided with structures carried adjacent the lower portion of the valve stem and which engage the internal hubs of the gate valve to limit downward travel of the gate. When top-mounted, worm gear driven power operators are employed for control of the gate, the operator housing is placed in tension when the gate is in its lowermost position and the stem is against the internal downstop. Since the operator housing is virtually always formed of cast iron, it is possible for the casting to fail when placed under such tension.

Accordingly, it is a primary object of this invention to provide a novel stem stop construction which is easily adjustable relative to the valve stem and which eliminates the necessity of incorporating a manufacturing operation such as drilling into the operation of assembling the valve.

It is a further object of this invention to provide a novel valve stem stop structure which effectively promoted the field interchangeability of the valve stem and stem drive parts without requiring special machining tools or repair apparatus.

An even further object of this invention contemplates the provision of a novel stop structure for rising stem gate valves, which promotes adjustment of the stem stop structure, thereby eliminating necessity for adjustment shims and the like.

Among the objects of this invention is contemplated the provision of a novel stop structure for rising stem gate valves which eliminates the possibility of placing the housing structure of the operator under tension.

Briefly the invention involves a valve stem which is provided with standard acme threads of relatively coarse pitch for receiving the internal threads of a drive nut structure. The drive nut is rotatably journaled within an operator housing carried by the valve body and is mechanically rotated to impart longitudinal movement to the valve stem. The valve stem is also provided with fine-pitch threads which are formed on the crests of the acme threads in opposite relation to the pitch of the acme threads. A stop member is provided with fine internal threads which receive the fine-pitch external threads on the valve stem. The stem stop member is provided with a locking mechanism allowing limited rotation of the stop member relative to the valve stem. This limited movement effectively aids in both engaging and disengaging of the stop member relative to the drive nut structure of the valve as the gate is moved to or from its lowermost position, but it is not absolutely necessary.

Preferred embodiments of the invention have been chosen for purpose of illustration and description and are shown in the accompanying drawings forming a part of the specification where:

FIGURE 1 is a sectional view of a gate value constructed in accordance with the present invention;

FIGURE 2 is a fragmentary sectional view of a gate valve structure of FIGURE 1 illustrating the valve stem driving mechanism in detail and the valve in the closed position;

FIGURE 3 is a fragmentary sectional view of the valve mechanism illustrated in FIGURE 2 and showing the invention in detail;

FIGURE 4 is a fragmentary elevational view of the valve structure of FIGURE 1 illustrating the locking mechanism of the gate stop structure in detail;

FIGURE 5 is a fragmentary sectional view of the valve structure of FIGURE 1, including a modified embodiment of the invention.

Referring now to the drawings for a better understanding of this invention, a through conduit gate valve 10 is illustrated in FIGURE 1 which comprises a valve body assembly 12 and a bonnet assembly 14. The bonnet assembly is fixed to an upper flanged portion 15 of the valve body by a series of bolts 16 which are threaded into the body and which extend through openings 17 in the bonnet 14. The valve body and bonnet cooperate to define a valve chamber 18. The valve body is provided with inlet and outlet passageways 20 and 22, respectively, which are disposed in fluid communication with the valve chamber 18. The valve body 12 is provided with connection structure such as the flanged structure shown at 24 or the weld end structure illustrated at 26 for connection of the valve 10 to pipeline structure such as that illustrated at 28 in FIGURE 1. Various other conventional means of connection of the valve 10 into a pipeline may be employed without departing from the spirit or scope of this invention.

A pair of annular seat members 30 and 32, respectively, are retained within seat recesses disposed about the flow passabes 20 and 22 in substantially parallel relationship. A gate member 34 is disposed between the seat members for reciprocation within the valve chamber 18 and includes a port 36 for alignment with the flow passages 20 and 22 in the open position of the valve. The gate member 34 includes a solid portion 38 which blocks the flow passages 20 and 22 in the closed position of the valve to prevent the flow of fluid therethrough.

A yoke tube structure 40 is connected to the upper extremity of the bonnet member 14 by a series of bolts 42 and cooperates with the bonnet 14 to define an annular packing chamber 44, within which is disposed a stem packing construction. A valve stem 46 is connected to the upper extremity of the gate member 34 and extends in sealed relation through the packing chamber 44.

A stem operator construction generally designated 48 is connected by means of a series of bolts 50 to the upper extremity of the yoke tube 40.

Referring now particularly to FIGURE 2, the valve operator 48 is provided with the base section 52 which is connected by means of the bolts 50 to a flanged portion 54 of the yoke tube 40. The base section 52 is provided with an enlarged internal bore which cooperates with the upper portion of the loke tube 40 to define a thrust bearing chamber. Upper and lower thrust bearings 56 and 58, respectively, are disposed within the bearing chamber on either side of an annular flange 60 of a drive nut 62. The drive nut 62 is provided with internal threads which receive the external threads formed at the upper extremity of the valve stem 46. Upon rotation of the drive nut 62, the interthreaded engagement between the drive nut and valve stem will cause vertical movement of the valve stem 46 which in turn, through its connection with the gate 34, will cause vertical movement of the gate. A bevel gear 64 is nonrotatably fixed, such as by keying or the like, to the drive nut 62 and is rotated by a pinion gear 66 to impart rotation to the drive nut. A pinion gear shaft 68, which is either formed integrally with the pinion gear as illustrated in FIGURE 2 or connected thereto in obvious manner may be rotated manually by a handwheel 67 or the like. The shaft 68 might also be controlled by an electric or hydraulic motor for power control of the bevel gear operator 48. The pinion gear shaft 68 is rotatably received in a bearing aperture 72 formed in a housing portion 74 of the operator structure 48. A stem cover 76 is fixed to the housing structure 74 of the operator 48 about a central aperture formed in the housing. The stem cover 76 protects the valve stem when the valve stem is in the elevated or open position thereof.

With reference now particularly to FIGURES 3 and 4, the valve stem 46 is provided with relatively coarse acme threads 80 which are, for example, illustrated in FIGURE 3 as being left-hand acme threads. The illustration of left-hand threads is merely for purpose of explanation since right-hand acme threads may be employed with equal success within the scope of the instant invention. The valve stem 46 is provided with fine threads 82 which are chased upon the crests of the acme threads in oppositively disposed relation therewith. If, for example, the acme threads are left-hand threads as illustrated in FIGURE 3, the fine threads 82 will be right-hand threads. A stop member 84 is provided wth fine threads which mate with the fine threads 82. The stop member 84 by means of the external fine threads 82 on the valve stem 46 and the internal fine threads 86 in the stop member is longitudinally movable relative to the valve stem for adjustment. In accordance with one modification of the invention, a locking pin member 88 is received within a tangential bore 90 in the stop member 84. The tangential bore 90 is disposed in generally pitch line tangential relationship with the coarse threads 80 and on a pitch angle substantially parallel with the helix angle of these threads. The locking pin 88 in its inserted position is disposed between the flanks of the acme threads 80, and is of substantially smaller diameter than the distance between the flanks of the acme threads to allow easy insertion of the locking pin 88 into position between the flanks of the acme threads. The gap space between the flanks of the acme threads and the locking pin 88 allows limited axial movement and rotation of the stop member 84 relative to the valve stem 46 with the pin 88 in position. For example, the gap might allow the stop member 84 to rotate 15° relative to the valve stem before the gap is taken up and binding occurs.

In accordance with a modified embodiment of the invention as illustrated in FIGURE 5, a stop member 100 is formed with fine internal threads 102 which mate with the external threads 82 of the valve stem 46. A threaded bore 104 is formed in the stop member 100 in generally normal relation to the axis thereof. A set screw 106 is received within the bore 104 and has an integral projection 108 thereof which, in its engaged position, is disposed between the flanks of the acme threads 80. The projection 108 is provided with a frusto-conical extremity which substantially conforms to the included angle formed by the opposed flanks of the acme threads.

OPERATION

In assembly of the stop member 84 to the valve stem 46, the valve stem and gate member are placed nearly in their closed position and the down stop member 84 is screwed onto the fine threads 82 of the valve stem until the lowermost surface 92 of the stop member 84 engages the upper surface 94 of the stem nut 62. The locking pin 88 is then inserted between the flanks of the acme threads 80 as shown in FIGURE 3. If the tangential bore 90 of the stop member 84 does not line up exactly with the space between the flanks of the acme threads, the stop member is backed off to a position aligning the bore 90 with the space between the flanks of the acme thread. The locking pin 88 is then inserted between flanks of the acme thread, thereby locking the stop member 84 to the valve stem 46.

Assuming that the valve stem is in its upper position with the stop member 84 locked to the valve stem by the locking pin 88, right-hand rotation of the drive nut 62 by the bevel gear, as discussed above, will cause the valve stem 46 to move downwardly bringing the stop member 84 into intimate engagement with the upper surface 94 of the drive nut 62. As frictional engagement between the stop surface 92 of the stop member 84 and the upper surface 94 of the drive nut 62 occurs, the drive nut will attempt to trun the stop member 84 in a right-hand or clockwise direction when viewing the drive nut from the top side. Because of the oppositively directed fine threads 82, the locking member 84 upon being turned clockwise will merely move in a reverse linear direction into tighter engagement with the surface 94 of the drive nut. Tight engagement between the surfaces 92 and 94 will occur therefore with a minimum of movement between the locking member and the drive nut.

Assuming that the valve is in its closed position with the locking member 84 in engagement with the drive nut 62 as illustrated in FIGURE 3, and it is desired to open the valve member, the drive nut is rotated in a left-hand or counterclockwise direction when viewed in plan. The frictional engagement between the surfaces 92 and 94 causes the stop member 84 to be rotated in a left-hand or counterclockwise direction, which because of the fine threads on the valve stem 46, causes the stop member 84 to be moved slightly upwardly with respect to the valve stem 46 and separating the surfaces 92 and 94 with very little frictional rotation therebetween. The stop member 84 will only be rotated relative to the valve stem 46 a fractional amount controlled by the difference between the spacing of the flanks of the acme threads and the diameter of the pin member 88. This fractional rotation, however, is sufficient to move the stop member 84 out of engagement with the drive nut 62.

For any reason requiring readjustment of the stop member 84, the locking pin member 88 may be removed from the bore 90 and the stop member 84 rotated to realign the bore 90 with a specific one of the spaces between the flanks of the acme threads. Because of the nature of the threaded engagement between the valve stem and the stop member 84, adjustment of the stop member is incremental rather than infinite. For example, with a stop member having an internal thread having twelve (12) threads per inch and a stem having a double-lead acme thread, the adjustment of the stop member on the valve stem 46 will have adjustment positions in one twenty-fourth inch ($\frac{1}{24}''$) increments. Should it be desired to replace the valve stem 46 on the valve, the stop member 84 is unthreaded from its engagement with the fine threads 82 subsequently to removal of the locking pin 88. After the replacement valve stem has been received by the internal acme threads of the drive nut 62, the stop member 84 is threaded onto the new valve stem and is adjusted and locked to the valve stem in the manner described hereinabove.

The stop member 100 is assembled to the valve stem and properly positioned thereon in substantially the same manner as is the stop member 84. With the valve and stem positioned nearly in the lowermost position and stop member 84, with the set screw 106 removed or backed off, is threaded onto the fine threads 82 until it engages the upper surface 94 of the drive nut 62. The set screw 106 is then threaded fully into the threaded bore 104 positioning the projection between the flanks of the acme threads in the manner shown in FIGURE 5. If the projection does not align with the space between the flanks of the acme threads in this position, it is backed off slightly to cause such alignment and the set screw is fully threaded into the bore 104 locking the set screw into its operative position.

As the lower surface of the stop member 100 is brought into frictional engagement with the upper surface 94 of the drive nut 62, the stop member will be rotated a fractional amount relative to the valve stem 46 by the frictional engagement thereby driving the stop member toward the drive nut and causing the frictional engagement to become infinite virtually instantaneously. There will be very little relative movement between the stop member 100 and the drive nut 62 after contact is made.

Upon counterrotation of the drive nut 62 to raise the valve stem 46, the stop member will be driven away from the drive nut by the frictional engagement therebetween, thereby virtually instantaneously separating the stop member and drive nut with slight relative rotation therebetween.

It will be evident from the foregoing that we have provided a unique valve stem stop or gate valve positioning construction which is received by the valve stem and which may be adjusted relative to the valve stem without requiring the necessity of shims or involving a manufacturing operation such as drilling the valve stem for pin connection. The novel valve stem stop construction effectively allows connection of a stop member to the valve stem without requiring operation such as drilling the valve stem which would weaken the valve stem construction. The invention effectively promotes the interchangeability of the valve stem and other parts either in the repair shop or in the field without requiring special tools or involving manufacturing operations. The stop member is readily adjustable on the valve stem in increments determined by the pitch of the fine threads of the stop member and the pitch and lead of the acme threads, thereby eliminating the necessity for using shims or the like for making such adjustment. It is seen, therefore, that this invention is one well adapted to obtain all of the objects hereinabove set forth together with other advantages which will become obvious and inherent from the description of the apparatus itself.

What is claimed is:

1. A valve comprising a valve body defining a valve chamber and having inlet and outlet passages in fluid communication with the valve chamber, a gate member disposed within the valve chamber and being reciprocable between open and closed positions for controlling the flow of fluid through the inlet and outlet passages, a non-rotating valve stem connected to said gate and adapted to impart reciprocal movement thereto, said valve stem being provided with first thread means and having second thread means formed on said first thread means and being of opposite pitch relative to said first thread means, a stem drive nut rotatably carried by said valve body and being threadedly received by said first thread means, a valve actuator connected to said valve and having rotary drive means connected to said drive nut for imparting rotary movement to said drive nut, whereby through said threaded engagement between said stem and drive nut, reciprocal movement may be imparted to said valve stem, a stop threadedly received by said second thread means and having a removable projection disposed between the flanks of said first thread means, said projection being smaller than the distance between the flanks of said first thread means and allowing limited axial movement and rotation of said stop relative to said stem, said stop upon engaging said drive nut being axially and rotatively driven relative to said stem within limits allowed by said projection by frictional engagement between said drive nut and stop thereby tightening the engagement therebetween, and upon reversing the direction of rotation of said drive nut said frictional engagement driving said stop in reverse directions.

2. A valve as set forth in claim 1, said projection being a set screw disposed between the flanks of said first thread means.

3. A valve as set forth in claim 1, said projecting being a removable pin disposed between the flanks of said first thread means.

4. A valve as set forth in claim 3, said pin being disposed in tangential relation with said stem and substantially parallel with the pitch line of said first thread means.

5. A valve stem construction for a gate valve having a gate member in nonrotatable assembly with said stem, said stem construction comprising a stem member having first thread means formed thereon and second thread means formed on said first thread means in opposed pitch direction to the pitch direction of said first thread means, a drive nut rotatably received by said stem and having internal threads interengaging with said first thread means, a stem stop member having internal threads interengaging with said second thread means, said stop member adapted to engage said drive nut to limit longitudinal movement of said stem in one direction relative to said drive nut, locking means on said stop member disposed between the flanks of said first thread means and establishing driving connection between said stop member and said first thread means, said locking means being substantially smaller than the distance between the flanks of said first thread means and allowing limited axial movement and rotation of said locking means relative to said stem, said stop member upon engaging said drive nut being driven relative to said stem axially and rotatively within limits allowed by said locking means by frictional engagement between said drive nut and stop members thereby moving said stop member axially and rotatively relative to the stem thereby tightening the engagement between said drive nut and said stop member, upon reversing the direction of rotation of said drive nut relative to said stem said frictional engagement driving said stop member in reverse directions.

6. A valve stem construction as set forth in claim 5, said locking means being an elongated tangential locking pin which is disposed between the flanks of said first thread means and substantially parallel with the pitch line of said first thread means, said locking means allowing limited frictional rotation of said stop means relative to said stem member.

7. A valve stem construction as set forth in claim 5, said locking means being a movable projection disposed between the flanks of said first thread means.

References Cited

UNITED STATES PATENTS

| 833,530 | 10/1906 | Knopf | 151—16 |
|---|---|---|---|
| 905,407 | 12/1908 | Butchart | 251—285 X |
| 1,936,301 | 11/1933 | Hansen et al. | 251—285 X |
| 2,964,961 | 12/1960 | Gulick | 74—424.8 XR |
| 3,330,530 | 7/1967 | Andrae | 74—424.8 XR |

FOREIGN PATENTS

| 10,999 | 2/1912 | Great Britain. |
|---|---|---|
| 4,893 | 8/1913 | Great Britain. |
| 183,024 | 7/1922 | Great Britain. |

HENRY T. KLINKSIEK, Primary Examiner

U.S. Cl. X.R.

74—81.5, 424.8; 151—16; 251—265